United States Patent
Liao et al.

(10) Patent No.: US 8,428,375 B2
(45) Date of Patent: Apr. 23, 2013

(54) SYSTEM AND METHOD FOR DATA COMPRESSION AND DECOMPRESSION IN A GRAPHICS PROCESSING SYSTEM

(75) Inventors: Qunfeng (Fred) Liao, San Jose, CA (US); Mike Hong, Cupertino, CA (US)

(73) Assignee: VIA Technologies, Inc., Taipei (TW)

( * ) Notice: Subject to any disclaimer, the term of this patent is extended or adjusted under 35 U.S.C. 154(b) by 358 days.

(21) Appl. No.: 12/948,042

(22) Filed: Nov. 17, 2010

(65) Prior Publication Data

US 2012/0121198 A1    May 17, 2012

(51) Int. Cl.
*G06K 9/36* (2006.01)

(52) U.S. Cl.
USPC ........... 382/238; 382/233; 382/245; 382/246; 382/250; 382/251

(58) Field of Classification Search .................. 382/232, 382/233, 245, 246, 250, 251, 253; 358/426.02, 358/426.07, 426.06, 426.09, 426.1, 426.11; 348/394.1, 409.1, 412.1, 413.1, 415.1, 416.1, 348/410.1, 418.1, 419.1
See application file for complete search history.

(56) References Cited

U.S. PATENT DOCUMENTS

| | | | | |
|---|---|---|---|---|
| 7,173,971 | B2 * | 2/2007 | Amara et al. | 375/240.27 |
| 7,382,932 | B2 * | 6/2008 | Hattori | 382/275 |
| 7,542,623 | B2 * | 6/2009 | Hattori | 382/275 |
| 2003/0202712 | A1 * | 10/2003 | Stefan Porter et al. | 382/251 |
| 2009/0116757 | A1 * | 5/2009 | Neogi et al. | 382/238 |

* cited by examiner

*Primary Examiner* — Ali Bayat
(74) *Attorney, Agent, or Firm* — McClure, Qualey & Rodack, LLP (57) ABSTRACT

Methods and systems for data compression and decompression in a graphics processing system are provided. For example, in at least one embodiment, a method comprises distributing the graphics data values of a pixel block about zero to minimize redundancy, and the pixel block includes a plurality of quadrants. The method further comprises determining whether to encode the distributed graphics data values, and responsive to a determination to encode the distributed graphics data values, encoding at least one graphics data value of one of the quadrants depending on an encoding indicator. The encoding includes determining an entropy parameter and dividing each positive data value by the entropy parameter yielding an entropy part and a noise part.

8 Claims, 6 Drawing Sheets

SYSTEM AND METHOD FOR DATA COMPRESSION AND DECOMPRESSION IN A GRAPHICS PROCESSING SYSTEM

TECHNICAL FIELD

The present disclosure is generally related to computers and, more particularly, is related to data compression and decompression in a graphics processing system.

BACKGROUND

A graphics processor is a specialized processor in a computer that offloads graphics rendering from a microprocessor. Graphics processors are used to accelerate the memory-intensive work of texture mapping and rendering polygons as well as rotation and translation of vertices into different coordinate systems. Some graphics processors also include programmable shaders that are capable of manipulate vertices and textures with many of the same operations that are supported by microprocessors, oversampling and interpolation techniques to reduce aliasing, and very high-precision color spaces.

SUMMARY

Embodiments of the present disclosure provide methods and systems for performing control of flow in a graphics processor architecture. For example, in at least one embodiment, among others, a system for compressing graphics data values comprises a difference calculator configured to calculate differences in graphics data values for neighboring pixels in a pixel block and a predictor configured to predict a prediction value for each pixel in the pixel block based on the calculated differences. The system further comprises a prediction error calculator configured to calculate a prediction error value for each pixel in the pixel block based on the prediction value for each pixel and a mapper configured to map each prediction error value to a positive data value resulting in a plurality of mapped data values. Also, the system comprises an entropy parameter calculator configured to determine an entropy parameter and a divider configured to divide each mapped data value by the determined entropy parameter yielding an entropy part and a noise part. Further, the system comprises an encoder configured to encode the entropy part and the noise part, wherein the determined entropy parameter satisfies the relationships:

$$[\text{Entropy}L(K)-\text{Entropy}L(K+2)]>[\text{Noise}L(K+2)-\text{Noise}L(K)]$$

and $$[\text{Entropy}L(K-2)-\text{Entropy}L(K)]<[\text{Noise}L(K)-\text{Noise}L(K-2)].$$

As another example, in at least one embodiment, among others, a method includes a method of reducing memory bandwidth. The method comprises distributing the graphics data values of a pixel block about zero to minimize redundancy, and the pixel block includes a plurality of quadrants. The method further comprises determining whether to encode the distributed graphics data values, and responsive to a determination to encode the distributed graphics data values, encoding at least one graphics data value of one of the quadrants depending on an encoding indicator. The encoding includes determining an entropy parameter and dividing each positive data value by the entropy parameter yielding an entropy part and a noise part.

As another example, in at least one embodiment, among others, a method includes a method of decompressing graphics data of a pixel block. The method comprises retrieving an entropy parameter for each channel in a quadrant and retrieving an entropy part for each channel in the quadrant. Further, the method comprises determining the bit length of the noise part for each channel based on the bit length of the entropy part corresponding to each respective noise part and decoding the entropy part and the noise part. The method additionally comprises multiplying each of the decoded entropy part and the decoded noise part by the retrieved entropy parameter and mapping a sum of the products using a reverse overlap and interleave scheme. Also, the method comprises removing a prediction relationship between the pixels of the quadrant.

Other systems, methods, features, and advantages of the present disclosure will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The present disclosure generally relates to systems and methods for compressing and decompressing graphics data in a graphics processing unit (GPU). Since rendering in a GPU is becoming increasingly complex and specialized, intermediate render targets are frequently being used as textures. In some cases, the color format for those intermediate render targets is a high dynamic range (HDR) format, which can consume a large amount of memory bandwidth to read and write the texture. By compressing according to the systems and methods described herein, a reduction of memory bandwidth consumption between approximately 47% and 87% may be possible.

Before compression, the graphics data includes frames, and the frames include pixel blocks. Each pixel block includes a plurality of pixels, and the pixel block is subdivided into four quadrants. The systems and methods described below perform the compression or decompression of the graphics data quadrant by quadrant.

As will be discussed in further detail below, according to some embodiments, the method includes distributing the original (uncompressed) graphics data about zero as well as minimizing redundancy in the graphics data. To this end, differences between neighboring pixels are calculated, graphics data values are predicted, and a prediction error value is calculated for each pixel, which is typically a smaller value than the predicted value and further reduces the graphics data. The prediction error values may be positive or negative and are distributed about zero.

To put the prediction error values in a form for encoding, the prediction error values are mapped to positive values. These positive values are divided by an entropy parameter, which yields an entropy part (quotient) and a noise part (remainder). Prior to the division, the entropy parameter is determined for each value as a part of the compression process, and the entropy parameter ensures that the bit length of the entropy part and the noise part will be the optimal bit lengths, as will be discussed in further detail below. Then the entropy part is encoded according to unary coding, and the noise part is coded according to binary coding.

In some embodiments, encoding indictors are employed to indicate whether the data should be encoded. The encoding indicators allow the mapping, entropy parameter determining, dividing, encoding, etc. of graphics data for a quadrant to be skipped when the graphics data of the quadrant is mostly zeros or low values.

Figure 1A:
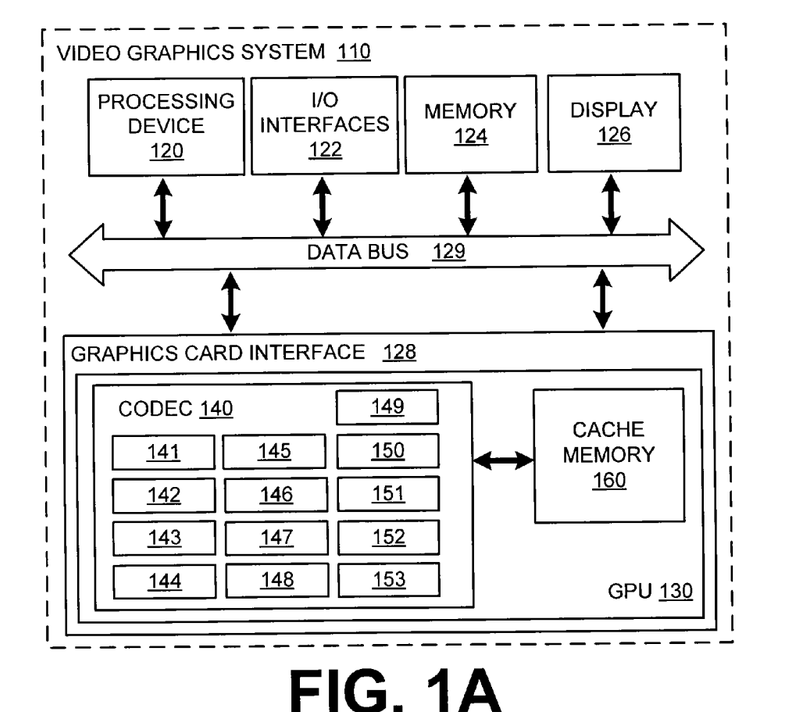
FIG. 1A is a block diagram illustrating an embodiment of a video graphics system according to the present disclosure.

FIG. 1A is a block diagram illustrating an embodiment of a video graphics system according to the present disclosure. In some embodiments, the video graphics system 110 may be, but is not limited to, any of a variety of computing devices such as any one or more of a wide variety of wired and/or wireless computing devices, such as a desktop computer, portable computer, dedicated server computer, multiprocessor computing device, cellular telephone, personal digital assistant (PDA), handheld or pen based computer, embedded appliance and so forth.

In FIG. 1A, the illustrated embodiment of a video graphics system 110 includes a processing device 120, I/O interfaces 122, a memory 124, a display 126, and a graphics card interface 128 in communication with each other via a data bus 129. The display 126 displays the video and includes a computer monitor, a plasma screen, and/or a liquid crystal display (LCD), for example.

Processing device 120 can include a custom-made or commercially available processor, a central processing unit (CPU) or an auxiliary processor among several processors associated with the video graphics system 110, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

Input/output interfaces 122 provide a number of interfaces for the input and output of data. For example, where the video graphics system 110 comprises a personal computer, these components may interface with a user input device, which may be a keyboard or a mouse. Where the video graphics system 110 comprises a handheld device (e.g., PDA, mobile telephone), these components may interface with function keys or buttons, a touch sensitive screen, a stylist, etc.

The memory 124 includes one or more of volatile memory elements (e.g., random-access memory (RAM, such as DRAM, and SRAM, etc.)) and nonvolatile memory elements (e.g., ROM, hard drive, tape, CDROM, etc.). The memory 124 stores data as well as a native operating system, one or more native applications, emulation systems, or emulated applications for any of a variety of operating systems and/or emulated hardware platforms, emulated operating systems, etc. One of ordinary skill in the art will appreciate that memory 124 can, and typically will, comprise other components, which have been omitted for purposes of brevity.

The graphics card interface 128 includes a graphics processing unit (GPU) 130 that provides programmable processing for certain functions such as pixel shading. A GPU 130 may be implemented as a separate coprocessor that performs specialized processing tasks in addition to a processing device 120. In performing these specialized processing tasks, the GPU 130 may free the processing device 120 to perform other tasks. In some embodiments, the GPU 130 may reside on the motherboard of the video graphics system 110 along with the processing device 120. However, in other applications, as one of ordinary skill in the art would know, a GPU 130 may reside on a separate but electrically coupled card, such as a graphics card interface 128, as illustrated in FIG. 1A. The GPU 130 illustrated in FIG. 1A includes a codec 140 (including modules 141-153) and a cache memory 160.

Figure 1B:
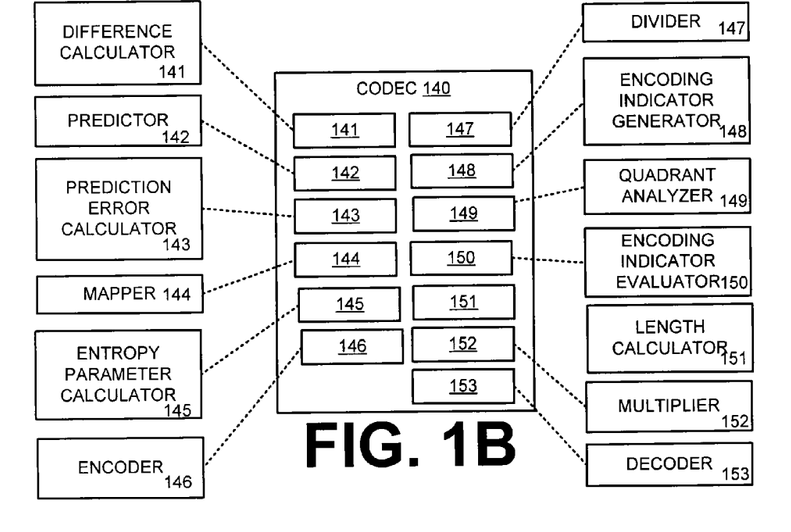
FIG. 1B is a block diagram illustrating an example of the codec of the embodiment of a video graphics system shown in FIG. 1A.

FIG. 1B illustrates an example of the codec 140 of the embodiment of a video graphics system 110 shown in FIG. 1A. Specifically, the codec 140 includes a difference calculator 141, a predictor 142, a prediction error calculator 143, a mapper 144, an entropy parameter calculator 145, a divider 146, an encoder 147, an encoding indicator generator 148, a quadrant analyzer 149, an encoding indicator evaluator 150, a bit length calculator 151, a multiplier 152, and a decoder 153. These modules 141-153 are utilized during the compression of graphics data. The operation of the modules 141-153 will be discussed below in further detail.

When various modules of the codec 140 are implemented in software, it should be noted that the software can be stored on a variety of computer-readable medium for use by, or in connection with, a variety of computer-related systems or methods. In the context of this document, a "computer-readable medium" stores or communicates the program for use by or in connection with the instruction execution system, apparatus, or device. The computer readable medium can be, for example, but not limited to, an electronic, magnetic, optical, electromagnetic, infrared, or semiconductor system, apparatus, or device.

Also, any process descriptions or blocks in flow charts should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

Figure 2:
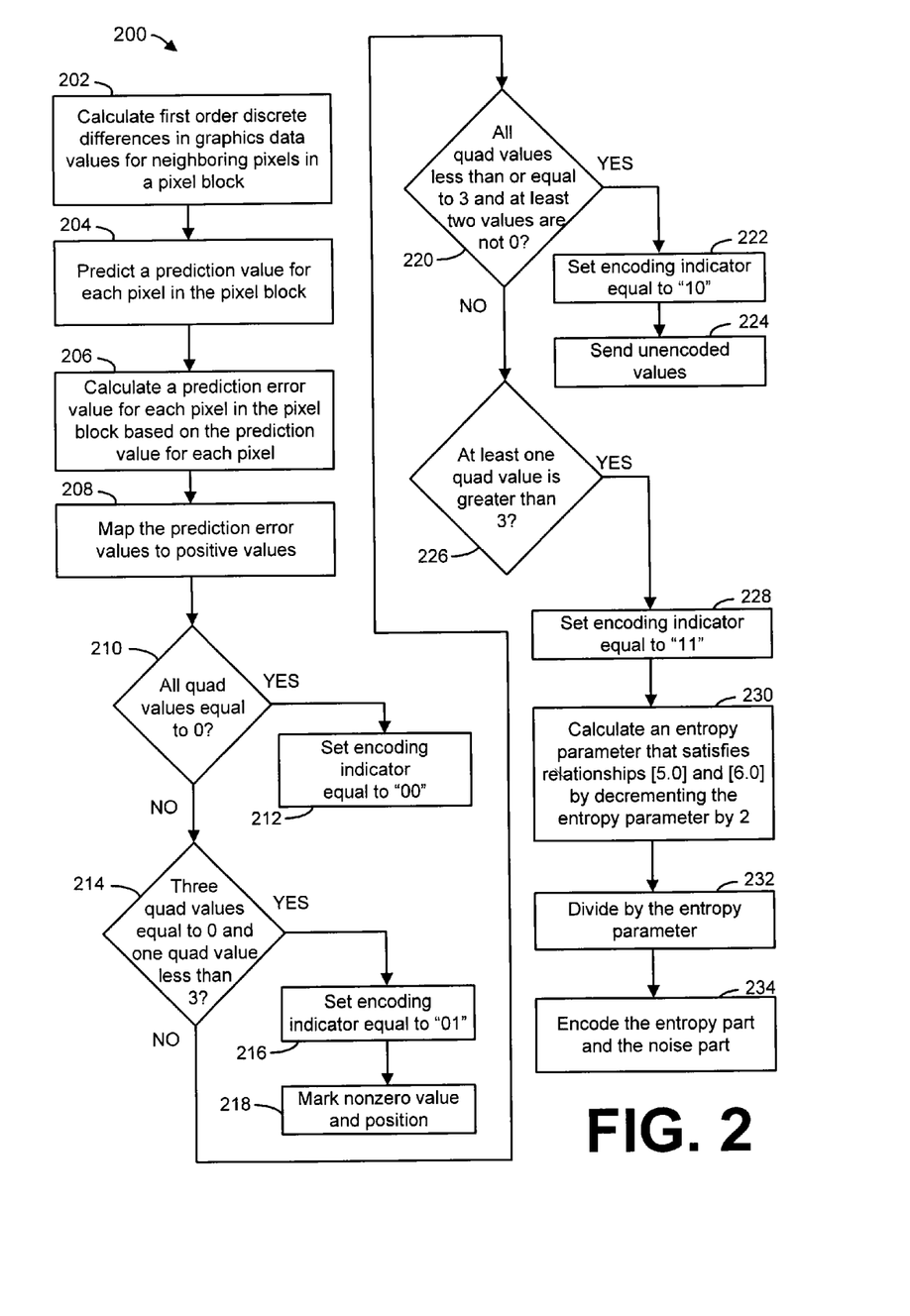
FIG. 2 is a flow chart illustrating a method of compressing graphics data according to an embodiment of the present disclosure.
Figure 3:
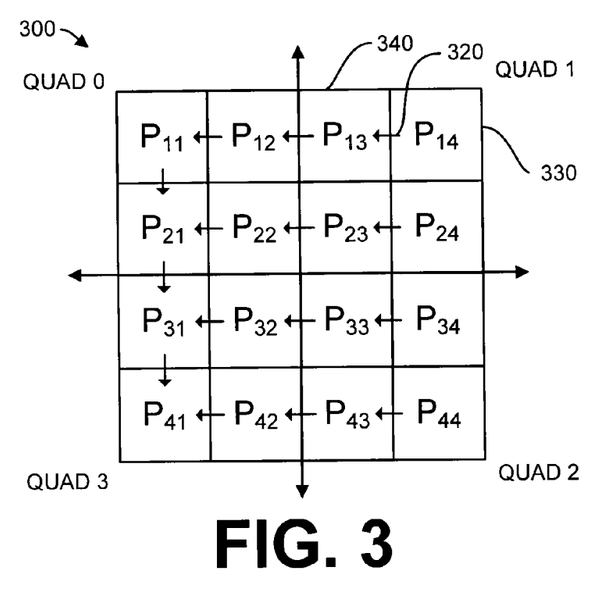
FIG. 3 is a block diagram illustrating a nonlimiting example of a pixel block having arrows illustrating a difference calculation.

FIG. 2 is a flow chart illustrating a method of compressing graphics data according to an embodiment of the present disclosure. The graphics data is segmented into frames, and each frame includes multiple pixel blocks. FIG. 3 is a block diagram illustrating a nonlimiting example of a pixel block 300. Each of the "$P_{ij}$" values indicates a pixel parameter value at that particular pixel location, and the pixel block 300 illustrated in FIG. 3 includes pixels $P_{11}$-$P_{44}$. Each pixel $P_{11}$-$P_{44}$ has multiple channels for different colors or other information. Also, the pixel block 300 is sub-divided into four quadrants QUAD 0, QUAD 1, QUAD 2 and QUAD 3 to facilitate compression.

Referring again to FIG. 2, in box 202, first order discrete differences in graphics data values for neighboring pixels in a pixel block are calculated using a difference calculator 141. The pixel block 300 illustrated in FIG. 3 includes arrows 320 representing the difference calculation. Note that a corner pixel, in this example, the top-left pixel $P_{11}$, is defined as a reference value. The arrow 320 points from the pixel corresponding to the subtrahend to the pixel corresponding to the minuend to illustrate that the subtrahend is subtracted from the minuend. For example, a graphics data value corresponding to pixel $P_{14}$ is subtracted from a graphics data vale corresponding to pixel $P_{13}$, resulting in a difference.

The following set of equations describe the difference calculation for the graphics data value corresponding to each pixel $P_1$:

$$dZ = \begin{cases} Z_{i,j} - Z_{i,j+1}, & 1 \leq i \leq d, j \geq 1 \\ Z_{i+1,j} - Z_{i,j}, & 1 \leq i \leq d, j = 1 \end{cases} \quad [1.0]$$

where d represents the dimensions of the pixel block 300 when the pixel block is a square. In other words, d represents the number of pixels in a row or column of a pixel block. In this nonlimiting example, d is equal to 4 since the pixel block 300 illustrated in FIG. 3 is a 4×4 pixel block. Since these calculations describe calculating a difference (i.e., change) between the graphics data values corresponding to each neighboring pixel, the calculation may also be referred to as a gradient or first order discrete difference.

Returning to FIG. 2, in box 204, a prediction value for each pixel in the pixel block is calculated using a predictor 142 based on the differences calculated in box 202.

Figure 4:
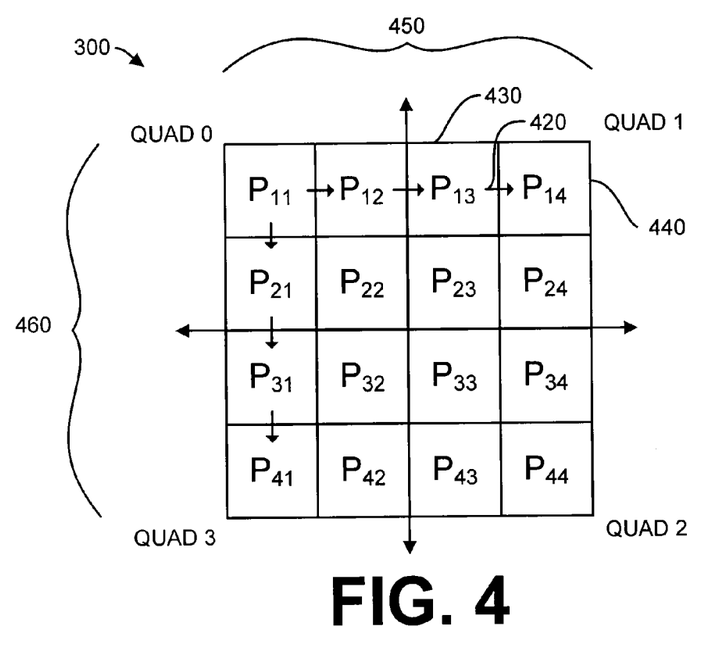
FIG. 4 is a block diagram illustrating a nonlimiting example of a pixel block having arrows illustrating a prediction.

FIG. 4 is a block diagram illustrating a nonlimiting example of a pixel block having arrows describing a prediction. Specifically, FIG. 4 illustrates the pixel block 300 of FIG. 3 including arrows 420 illustrating the prediction for the top row 450 and the leftmost column 460. For the top row 450 and the leftmost column 460, each arrow 420 points from the pixel having a corresponding parameter value used in the prediction to the predicted value. The value of a corner pixel, in this example, the top-left pixel $P_{11}$ of the pixel block 300 is encoded as a reference value. For the pixels $P_{12}$-$P_{14}$ in the top row 450 (excluding the top-left pixel $P_{11}$), the values for each pixel $P_{12}$-$P_{14}$ are predicted based upon the value of the neighboring pixel to the left. For example, the value of $P_{12}$ is predicted based upon the value of $P_{11}$, and the value of $P_{13}$ is predicted based upon the value of $P_{12}$. Similarly, for the pixels $P_{21}$-$P_{41}$ in the leftmost column 460 (excluding the top-left pixel $P_{11}$), the values for each pixel $P_{21}$-$P_{41}$ are predicted based upon the value of the neighboring pixel in the row above. For example, the value of $P_{21}$ is predicted based upon the value of $P_{11}$, and the value of $P_{31}$ is predicted based upon the value of $P_{21}$.

For the remaining pixels $P_{22}$-$P_{44}$ (i.e., pixels not in the top row 450 or the leftmost column 460), the prediction depends at least in part on a prediction bit that indicates whether to predict based upon the parameter value of the neighboring pixel to the left or the parameter value of the neighboring pixel above. The prediction bit is determined by whether the minimal difference in value would be calculated by predicting based upon the value of the neighboring pixel to the left or the value of the neighboring pixel above.

In box 206, a prediction error value is calculated for each pixel $P_{ij}$ in the pixel block 300 based on the prediction value for each pixel $P_{ij}$ using a prediction error calculator 143. The resulting prediction error values may include positive and negative numbers.

Boxes 202-206 effectively distribute the graphics data about zero to reduce redundancy and to reduce the amount of bits needed to express the graphics data. In cases where there are multiple four-by-four pixel blocks totally encompassed within a given triangle primitive, the pixels within the pixel block all lie within a common plane, and the prediction error for a vast majority of the pixels will be zero, thus reducing the amount of data to encode.

In box 208, the distributed graphics data is mapped to positive values using an overlap and interleave scheme. In other words, the nth negative prediction error value (i.e., −n) is mapped to an nth odd number (2n−1), and the mth positive prediction error value is mapped to an mth even number (2m). This mapping can be also expressed mathematically as follows, where x represents a positive prediction error value, x' represents a mapped positive value, y represents a negative prediction error value, and y' represents a mapped negative value:

$$x' = 2|x| = 2x, x \geq 0 \quad [3.0]$$

and $$y' = 2|y| - 1 = -2y - 1, y < 0 \quad [4.0]$$

Accordingly, the result of the operation in box 220 is mapped data values, which are all positive values.

In boxes 210-226, a determination regarding whether to encode the mapped data values is made using an encoding indicator generator 148, and these determinations are made quadrant by quadrant for the pixel block 300. As illustrated in FIG. 3, QUAD 0 is the quadrant that includes the corner pixel $P_{11}$, which corresponds to the reference value. Since QUAD 0 includes the corner pixel, additional bits are added to the reference value to allow QUAD 0 to be encoded and decoded along with the other quadrants, which will be discussed in further detail below. Boxes 210-226 describe steps that are performed using the encoding indicator generator 148 on the mapped data values for QUAD 1, QUAD 2, and/or QUAD 3 and not QUAD 0.

Specifically, in box 210, the encoding indicator generator 148 determines whether all the mapped data values of a quadrant are equal to zero. If all the mapped data values of a quadrant are equal to zero, then in box 212 the encoding indicator generator 148 sets (or in some embodiments, generates) an encoding indicator equal to "00." The encoding indicator is a two-bit flag that indicates whether any of the mapped data values in the quadrant are encoded. This allows the method to bypass the encoding described below to reduce the time for compressing the graphics data. The method then proceeds to analyzing the next quadrant or the next pixel block, if all quadrants in the pixel block 300 have been compressed.

In box 214, if all the mapped data values of a quadrant are not equal to zero, then the encoding indicator generator 148 determines whether three of the mapped data values of a quadrant are equal to zero and whether one of the mapped data values of the quadrant are less than 3. If both three mapped data values are equal to 0 and one of the mapped data values is less than 3, then in box 216 the encoding indicator generator 148 sets (or in some embodiments, generates) an encoding indicator equal to "01." Further, in box 218, the encoding indicator generator 148 marks the nonzero value and the position of the nonzero value. The encoding indicator is a two-bit flag that indicates whether any of the mapped data values in the quadrant are encoded. This allows the method to bypass the encoding described below to reduce the time for compressing the graphics data. The method then proceeds to analyzing the next quadrant or the next pixel block, if all quadrants in the pixel block 300 have been compressed.

In box 220, if both three mapped data values are not equal to 0 and one of the mapped data values is not less than 3, then the encoding indicator generator 148 determines whether all of the mapped data values of the quadrant are less than or equal to 3 and at least two mapped data values are not equal to zero. If all of the mapped data values of the quadrant are less than or equal to 3 and at least two mapped data values are not equal to zero, then in box 222 the encoding indicator generator 148 sets (or in some embodiments, generates) an encoding indicator equal to "10." Additionally, in box 224, the mapped data values are included in the compressed data without being encoded. This allows the method to bypass the encoding described below to reduce the time for compressing the graphics data. The method then proceeds to analyzing the next quadrant or the next pixel block, if all quadrants in the pixel block 300 have been compressed.

Table 1 below summarizes the encoding indicator values by showing the quadrant values that correspond to the encoding indicator values as well as whether the values are to be encoded.

TABLE 1

Encoding Indicator Values and Indication

| Encoding Indicator (2-bit flag) | Quadrant Values | Encode One or More Values in the Quadrant? |
|---|---|---|
| 00 | Quadrant values are all equal to 0. | No |
| 01 | Three values in quad are equal to 0 and the fourth value is less than or equal to 3. | No |
| 10 | All values are less than or equal to 3 and at least two values are not equal to 0. | No |
| 11 | At least one of the values is greater than 3. | Yes (encode only the values greater than 3) |

In box 226, if all of the mapped data values of the quadrant are not less than or equal to 3 or at least two mapped data values are equal to zero, then the encoding indicator generator 148 determines whether at least one mapped data value of the quadrant is greater than 3. If a mapped data value is greater than 3, then in box 228 the encoding indicator generator 148 sets (or in some embodiments, generates) an encoding indicator equal to "11." Since at least one mapped data value is greater than 3 for the quadrant, the method will proceed to encode one or more mapped data values for the quadrant in box 230.

Specifically, in box 230, an entropy parameter calculator 145 calculates an entropy parameter K (for each channel of each pixel in the quadrant) that satisfies the following relationships by decrementing the entropy parameter by 2:

$$[EntropyL(K) - EntropyL(K+2)] > [NoiseL(K+2) - NoiseL(K)] \quad [5.0]$$

$$[EntropyL(K-2) - EntropyL(K)] < [NoiseL(K) - NoiseL(K-2)] \quad [6.0]$$

where EntropyL represents the bit length of the entropy part and NoiseL represents the bit length of the noise part. In other words, the entropy parameter K is obtained when (a) the increase in the bit length of the entropy part is less than the decrease in the bit length of the noise part and (b) the next decrement in the entropy parameter K leads to an increase in the bit length of the entropy part that is more than the bit length of the noise part.

The compression scheme takes the strategy that search for the entropy parameter K in each channel of the quad using a greedy algorithm iteratively proceeding from a maximum value to zero by decrements of 2. For example, where there are 8 bits per channel (bpc), the entropy parameter K is evaluated starting at 6, and where there are 16 bpc, the entropy parameter K is evaluated starting at 14. Each time the entropy parameter K is decreased by 2, the bit length of the noise part of the channel will decrease by 8 (four pixels, each decreasing by 2). Further, each time the entropy parameter K is decreased by 2, the bit length of the entropy part will increase. Although, the compression scheme could instead decrease the entropy parameter K by decrements of 1 instead of 2, the decrement of 1 increases the complexity of the calculation with little benefit.

In box 232, a divider 146 divides the mapped data values of each channel by the entropy parameter K that corresponds to the channel. Specifically, each parameter value is divided into two parts: an entropy part and a noise part by an entropy parameter K, which is tunable. The entropy part is the quotient, and the noise part is the remainder. For every channel in the quad, an entropy parameter K is determined that makes the total coding length optimal.

In box 234, the entropy part and the noise part for each channel are each encoded. The encoded entropy part will be included in the most significant bits (MSBs), and the encoded noise part will be included in the least significant bits (LSBs). The entropy part is encoded according to unary encoding, and the noise part is encoded according to binary coding. Unary coding is an encoding that represents a natural number, n, with n−1 ones being followed by a zero. For example, the number 5 would be encoded as 11110 according to unary coding. Alternatively, the natural number n may be encoded as n−1 zeros being followed by a one.

Also, in some embodiments, entropy parameters for the first quadrant QUAD 0 are divided into two parts. For example, if the entropy parameters are Kr, Kg, Kb, and Ka for the corner pixel, they will be divided into two parts. The higher 32 (Kr+Kg+Kb+Ka) bits are sent at the head of the compressed graphics data. Further, the lower (Kr+Kg+Kb+Ka) bits are encoded as a noise part having a corresponding entropy part that is equal to 1.

Information regarding how the data is organized, whether the data is signed or unsigned, float format or fixed format is not necessary for the performance of method 200. The method 200 illustrated in FIG. 2 is particularly useful for compressing graphics data where the graphics data is z-surface data.

Figure 5:
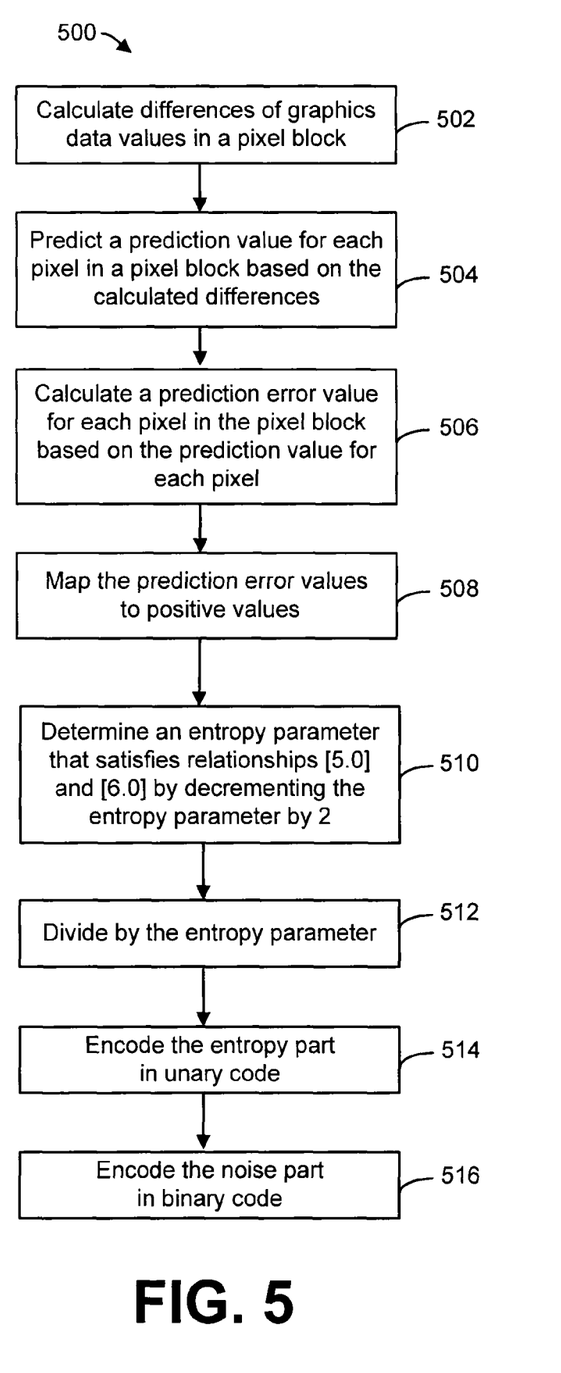
FIG. 5 is a flow chart illustrating a method of compressing graphics data according to another embodiment of the present disclosure.

FIG. 5 illustrates another embodiment of a method of compressing data that is similar to the method described in FIG. 2, except for a few notable differences. In box 502, the differences of graphics data values in a pixel block are calculated by a difference calculator 141. In embodiments where the graphics data is multi-sample anti-aliasing (MSAA) data, where each pixel includes multiple samples, a sample0 is subtracted from the other samples. In other embodiments, first order discrete differences, gradients, and/or slopes are generated by calculating the differences in neighboring pixels as described above regarding box 202 in the method of FIG. 2. As another difference, there are no boxes regarding determining whether to encode based on the mapped data values in a quadrant. In other words, an encoding indicator is not employed in the method illustrated in FIG. 5.

Figure 6:
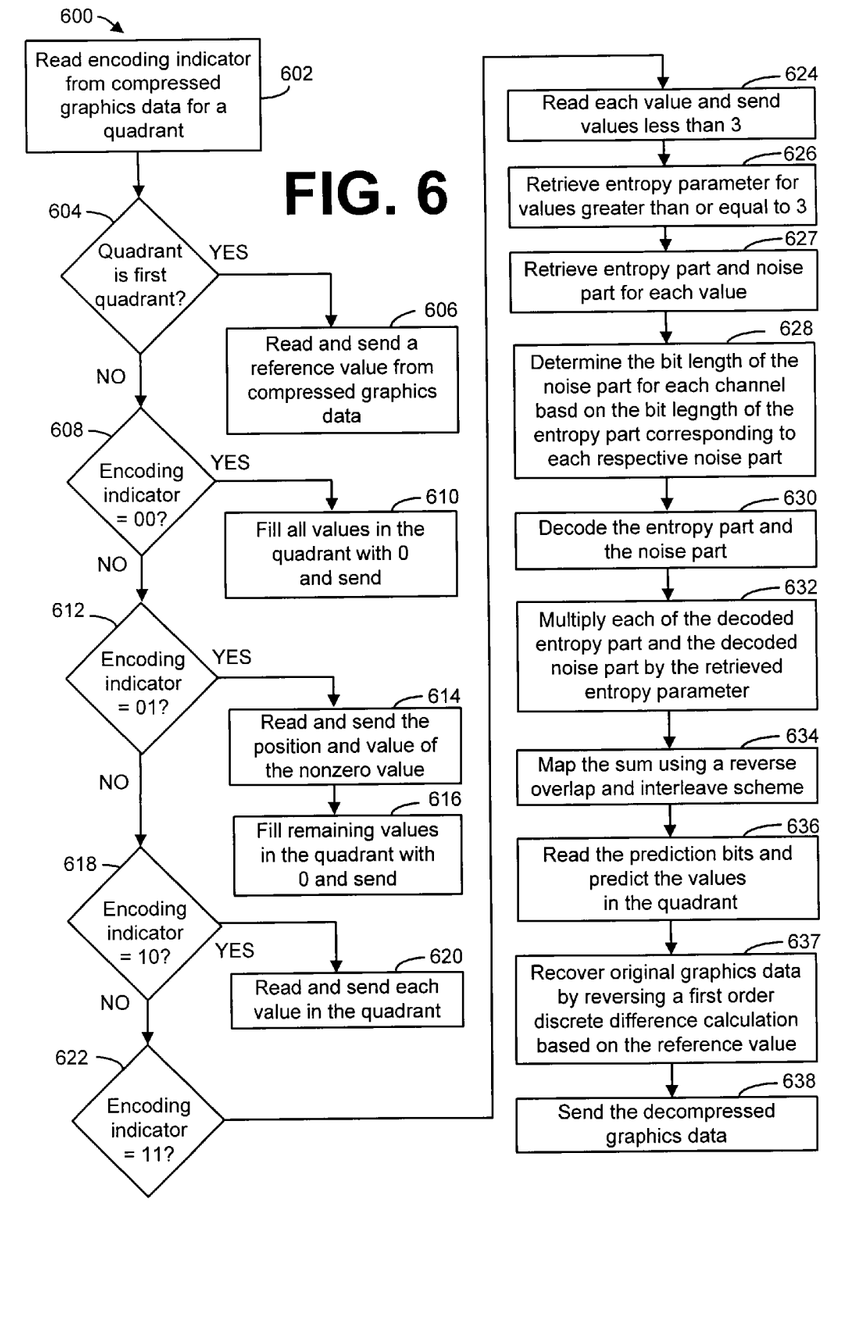
FIG. 6 is a flow chart illustrating a method of decompressing graphics data according to an embodiment of the present disclosure.

Having described various methods of compressing graphics data, methods of decompressing graphics data will be disclosed. For example, FIG. 6 illustrates a method 600 of decompressing graphics data. The method 600 may be particularly useful for decompressing graphics data compressed according to the method 200 illustrated in FIG. 2.

In box 602, an encoding indicator is read from the compressed graphics data for a quadrant, and in box 604 a determination regarding whether the quadrant is a first quadrant is made using a quadrant analyzer 149. (The first quadrant includes a corner pixel that corresponds to the reference value for the pixel block.) In some embodiments, the quadrant analyzer 149 determines whether the quadrant to be analyzed is the first quadrant of four quadrants to be analyzed. For example, with reference to FIG. 3, a determination as to whether the quadrant is QUAD 0 is made by a quadrant analyzer 149. In other words, the quadrant analyzer 149 determines whether a quadrant including the corner pixel (the top-left pixel P11 in pixel block 300) is presented. If the quadrant is the first quadrant, then a reference value corresponding to the corner pixel is read from the compressed graphics data, and the reference value is sent as a decompressed graphics data value.

In box 608, if the quadrant is the first quadrant, then the entropy indicator evaluator 150 determines whether the encoding indicator (a two-bit flag) is equal to "00." If the encoding indicator is equal to "00," then all the values for the quadrant are filled with a "0" in box 610 and each value is sent as a decompressed graphics data value.

In box 612, if the encoding indicator is not equal to "00," then the entropy indicator evaluator 150 determines whether the encoding indicator is equal to "01". If the encoding indicator is equal to "01," then the position and value of the nonzero value is read in box 614, and the remaining values in the quadrant are filled with a "0," as indicated in box 616 and each value is sent as a decompressed graphics data value.

In box 618, if the encoding indicator is not equal to "01," then the entropy indicator evaluator 150 determines whether the encoding indicator is equal to "10". If the encoding indicator is equal to "10," then each value in the quadrant is read, as indicated in box 620, and each value is sent as a decompressed graphics data value.

In box 622, if the encoding indicator is not equal to "10," then the entropy indicator evaluator 150 determines whether the encoding indicator is equal to "11." If the encoding indicator is equal to "11," then each value in the quadrant is read, as indicated in box 620. The values less than 3 are sent as decompressed graphics data values, and the values that are 3 or greater are further processed as indicated in boxes 626-638.

In box 626, an entropy parameter for values greater than or equal to 3 are retrieved for each value of the quadrant. In box 627, the entropy part and noise part are retrieved for each value. The entropy part is self-delimited due to the entropy part being encoded according to unary coding. In box 628, the bit length of the noise part for each channel is determined using a bit length calculator 151 based on the bit length of the entropy part corresponding to each respective noise part.

In box 630, the entropy part and the noise part are decoded using a decoder 153. Since the entropy part is encoded according to a unary coding method, the unary coding is reversed to decode the entropy part. Similarly, since the noise part is encoded according to a binary coding method, the binary coding is reversed to decode the noise part.

In box 632, the decoded entropy part and the decoded noise part are each multiplied by the retrieved entropy parameter and then summed using a multiplier 152.

In box 634, the sum values are mapped using a reverse overlap and interleave scheme using a mapper 144. Specifically, the even sum values are divided by 2. Further, 1 is added to the odd sum values, and each new sum value is divided by −2. The resulting values are positive and negative graphics data values distributed about zero.

In box 636, the prediction bits are read and the values corresponding to the pixels in the quadrant are predicted using a predictor 142. Referring to FIG. 4, the pixels in the top row 450 and leftmost column 460 of the pixel block 300 do not have prediction bits. The corner pixel, which in this example is P11, is the reference value, and for the top row 450, each value is predicted based on the value corresponding to the neighboring pixel to the left. Therefore, the value corresponding to pixel P12 would be predicted based on the value corresponding to P11. Similarly, for the leftmost column 460, each value is predicted based on the value corresponding to the neighboring pixel above. Therefore, the value corresponding to pixel P21 would be predicted based on the value corresponding to P11. For the remaining pixels in the pixel block 300 each value is predicted depending on a prediction bit. The prediction bit indicates whether the prediction is based upon the value of the neighboring pixel to the left or the value of the neighboring pixel above. The prediction relation between the pixels in the quadrant is removed.

In box 637, the original (uncompressed) graphics data is recovered by reversing a first order discrete difference calculation. In other words, the difference calculation illustrated in FIG. 3 is reversed. Each value corresponding to a pixel that is predicted in box 636 is added to a neighboring pixel. For example, the predicted value corresponding pixel P12 is added to the reference value corresponding to pixel P11 to yield an original graphics data value corresponding to pixel P12. Further, the predicted value corresponding to pixel P13 is added to the yielded original graphics data value corresponding to pixel P12 to yield an original graphics data value corresponding to pixel P13. Similarly, the predicted value corresponding to pixel P21 is added to the reference value corresponding to pixel P11 to yield an original graphics data value corresponding to pixel P21. Further, the predicted value corresponding to pixel P31 is added to the yielded original graphics data value corresponding to pixel P21 to yield an original graphics data value corresponding to pixel P31.

In box 638, as the compressed graphics data is decompressed, the decompressed graphics data is sent to the device or application that requested the decompressed graphics data.

Figure 7:
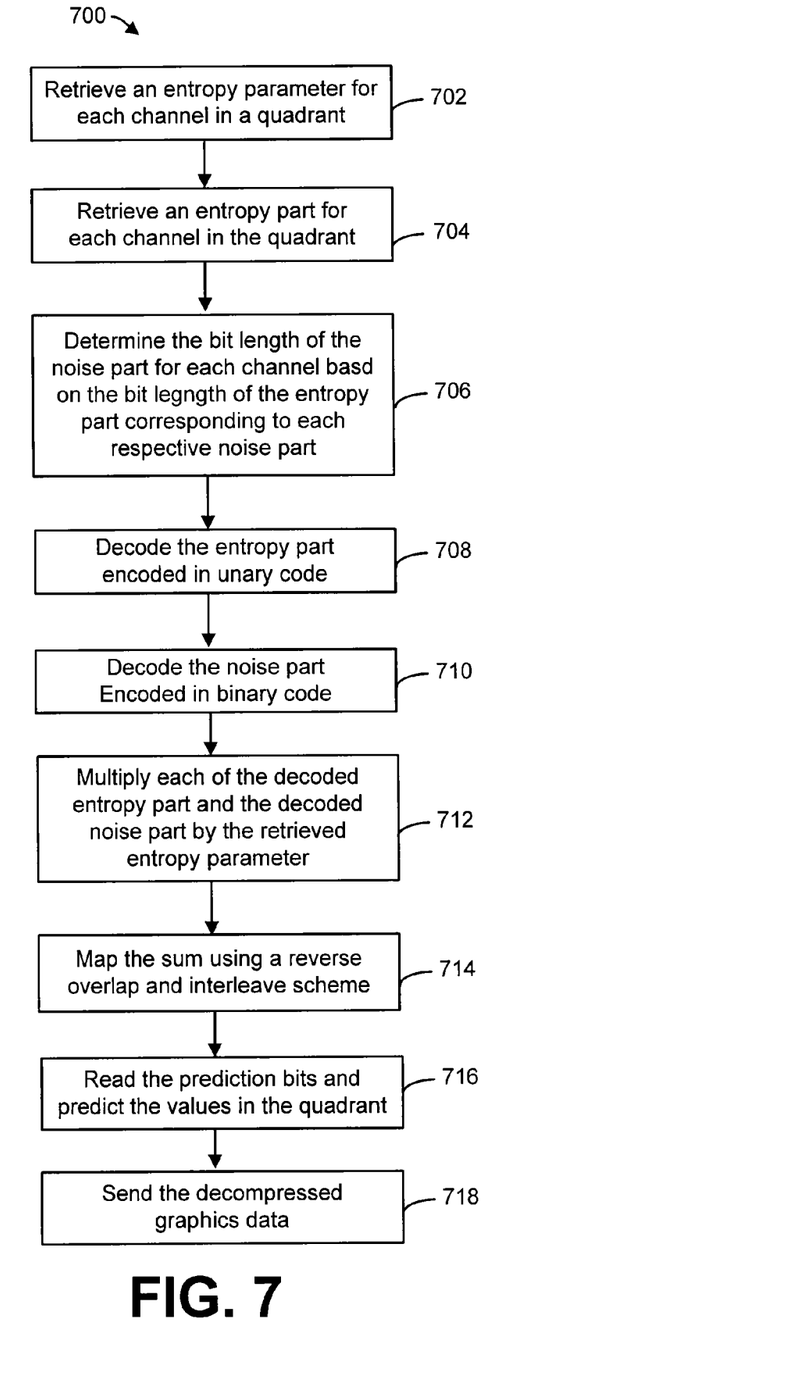
FIG. 7 is a flow chart illustrating a method of decompressing graphics data according to another embodiment of the present disclosure.

FIG. 7 illustrates another embodiment of a method for decompressing graphics data that is similar to the method described in FIG. 6, except for a few notable differences. The method 700 may be particularly useful for decompressing graphics data compressed according to the method 500 illustrated in FIG. 5. The method 700 illustrated in FIG. 7 does not use an encoding indicator in the manner described in FIG. 6. Additionally, box 637 of FIG. 6 is omitted from FIG. 7. Hence, no first order discrete difference calculations are reversed. In embodiments where the graphics data is multi-sample anti-aliasing (MSAA) data, where each pixel includes multiple samples, a sample0 is subtracted from the other samples, as discussed above. In those embodiments, the sample0 subtracted during compression is added to each value corresponding to the pixel to recover the original graphics data value.

The flow charts of FIGS. 2, 5, 6, and 7 show the architecture, functionality, and operation of a possible implementation. In this regard, each block represents a module, segment, or portion of code, which comprises one or more executable instructions for implementing the specified logical function(s). It should also be noted that in some alternative implementations, the functions noted in the blocks may occur out of the order noted in FIGS. 2, 5, 6, and 7. For example, two blocks shown in succession in FIGS. 2, 5, 6, and 7 may in fact be executed substantially concurrently or the blocks may sometimes be executed in the reverse order, depending upon the functionality involved.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

The invention claimed is:

1. A system for compressing graphics data values, the system comprising:
   a difference calculator configured to calculate differences in graphics data values for neighboring pixels in a pixel block;
   a predictor configured to predict a prediction value for each pixel in the pixel block based on the calculated differences;
   a prediction error calculator configured to calculate a prediction error value for each pixel in the pixel block based on the prediction value for each pixel;
   a mapper configured to map each prediction error value to a positive data value resulting in a plurality of mapped data values;
   an entropy parameter calculator configured to determine an entropy parameter;
   a divider configured to divide each mapped data value by the determined entropy parameter yielding an entropy part and a noise part; and
      an encoder configured to encode the entropy part and the noise part, wherein the determined entropy parameter satisfies the relationships:

$$[\text{Entropy}L(K)-\text{Entropy}L(K+2)]>[\text{Noise}L(K+2)-\text{Noise}L(K)]; \text{ and}$$

$$[\text{Entropy}L(K-2)-\text{Entropy}L(K)]<[\text{Noise}L(K)-\text{Noise}L(K-2)].$$

2. The system of claim 1, wherein the entropy parameter calculator is further configured to decrement the entropy parameter until the relationships are satisfied.

3. The system of claim 2, wherein the entropy parameter calculator is further configured to decrement the entropy parameter until by 2 until the relationships are satisfied.

4. The system of claim 1, wherein the encoder is further configured to encode the entropy part according to unary coding, and the encoder is further configured to encode the noise part according to binary coding.

5. The system of claim 1, further comprising an encoding indicator evaluator configured to determine whether to encode the mapped data value based on an encoding indicator,
   wherein the entropy parameter calculator is further configured to determine the entropy parameter responsive to a determination to encode the mapped data value,
   wherein the divider is further configured to divide each mapped data value by the determined entropy parameter responsive to a determination to encode the mapped data value, and
   wherein the encoder is further configured to encode the entropy part and the noise part responsive to a determination to encode the mapped data value.

6. The system of claim 1, wherein the prediction error values are mapped to positive data values according to an overlap and interleave scheme.

7. The system of claim 1, wherein a graphics data value corresponding to a corner pixel is encoded as a reference value,
   wherein the row including the corner pixel is defined as the top row and the column including the corner pixel is defined as the leftmost column,
   wherein data values for pixels in the top row other than the corner pixel are predicted based on the data value for the neighboring pixel to the left, and
   wherein data values for pixels in the leftmost column other than the corner pixel are predicted based on the data value for the neighboring pixel above.

8. The system of claim 7, wherein data values for pixels other than the pixels located in the top row and leftmost column are predicted according to a prediction bit.

* * * * *